United States Patent
Venkatesh

(10) Patent No.: US 8,937,968 B1
(45) Date of Patent: Jan. 20, 2015

(54) RECEIVED SIGNAL STRENGTH INDICATION FOR USE AS A BASEBAND PROCESSOR QUALIFIER IN HIGH DENSITY WLAN ENVIRONMENTS

(75) Inventor: Narasimhan Venkatesh, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 564 days.

(21) Appl. No.: 13/277,782

(22) Filed: Oct. 20, 2011

Related U.S. Application Data

(60) Provisional application No. 61/405,203, filed on Oct. 20, 2010.

(51) Int. Cl.
  *H04L 12/28* (2006.01)
(52) U.S. Cl.
  USPC .......................................... 370/431; 455/450
(58) Field of Classification Search
  CPC .. H04W 72/12; H04W 72/1226; H04W 72/08
  USPC ........................... 370/230, 447, 431; 455/450
  See application file for complete search history.

(56) References Cited

U.S. PATENT DOCUMENTS

| | | | |
|---|---|---|---|
| 7,738,876 B1 * | 6/2010 | Radhakrishnan et al. | 455/450 |
| 7,885,287 B2 * | 2/2011 | Bachrach et al. | 370/447 |

* cited by examiner

*Primary Examiner* — Dang Ton
*Assistant Examiner* — Kevin Lee
(74) *Attorney, Agent, or Firm* — File-EE-Patents.com; Jay A. Chesavage

(57) ABSTRACT

A station or access point has a list of associated stations including a BSSID. During an observation period, measurements of RSSI are made for each BSSID, including a maximum RSSI and a minimum RSSI. After the observation interval, an RSSI_threshold is computed which is below the weakest RSSI of a station which is on the list of associated stations, and also above the weakest RSSI of a station which is not on the list of associated stations. During packet reception, packet acquisition starts when the receiver signal level is detected to be above the RSSI_threshold. During packet transmission, a clear channel assessment (CCA), which ordinarily prevents transmission when signal energy is detected, is overridden if the measured RSSI is below the RSSI_threshold value, enabling earlier transmission of the packet than if the transmitter were to wait for CCA to be asserted.

19 Claims, 4 Drawing Sheets

Distributed Access Points in Stadium wireless links on same channel

Local Station Tx using CCA (prior art)

Local Station Rx using baseband preamble detect (prior art)

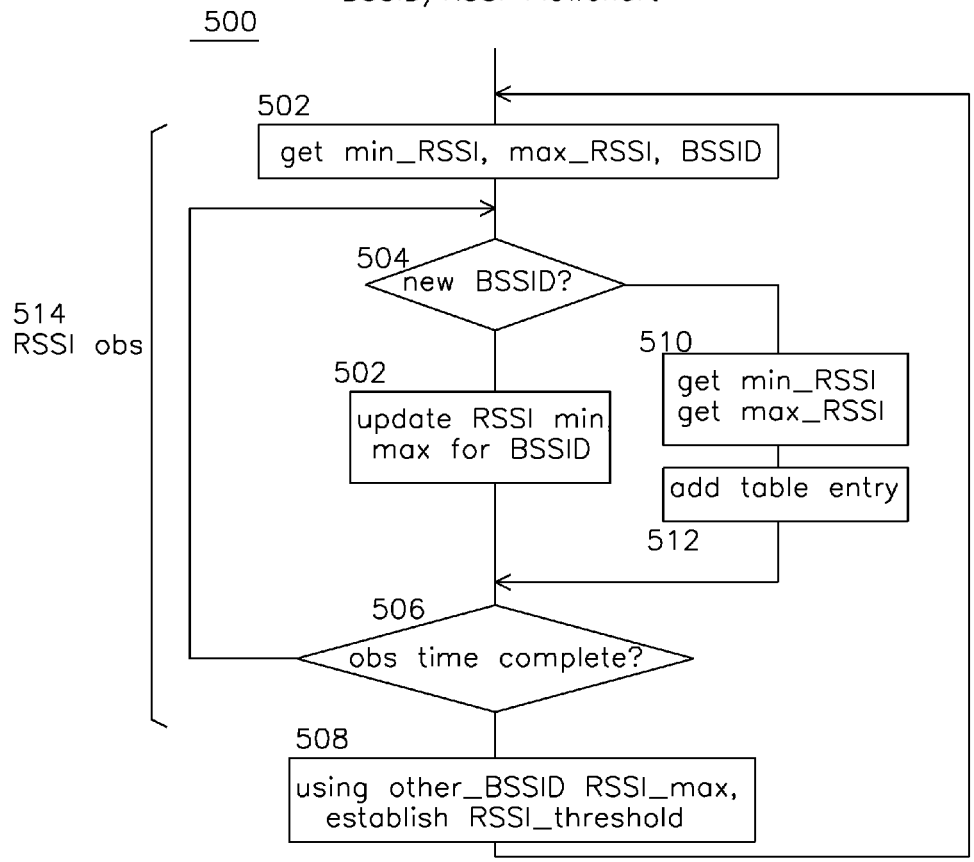

Local STA2 Tx using RSSI_threshold

Local Station Rx using baseband preamble detect (prior art)

US 8,937,968 B1

RECEIVED SIGNAL STRENGTH INDICATION FOR USE AS A BASEBAND PROCESSOR QUALIFIER IN HIGH DENSITY WLAN ENVIRONMENTS

FIELD OF THE INVENTION

This inventions claims priority of provisional patent application 61/405,203 filed Oct. 20, 2010.

The present invention relates to the operation of wireless Local Area Networks (WLAN) in dense environments. In particular, it relates to the computation of a Received Signal Strength Indicator (RSSI) threshold for use with a baseband processor to allow more efficient utilization of a congested wireless channel.

BACKGROUND OF THE INVENTION

FIG. 1 shows the diagram of a prior art distributed access point deployment, such as a sports stadium. Many wireless users may congregate in the stadium, and enhance their sport viewing experience using portable wireless devices which include a WLAN capability. In the prior art, a plurality of access points AP1 102, AP2 104, AP3 106, AP4 108, AP5 110, AP6 112, AP7 114, AP8 116 are placed around the perimeter of the stadium, or in any manner which provides adequate WLAN coverage over the stadium. Each of the access points (AP) advertises a BSSID (Basic Service Set Identifier), which is typically the MAC address of the access point. FIG. 2 shows the wireless links 202 and 210 between access points AP1 and AP5, respectively, to station STA1 118, all of which operate together on the using shared media access on channel 1, where each channel represents a 20 Mhz band of subcarrier frequencies to prevent interference with other channels. There may be many stations such as STA1 118, which associated with nearby AP1 102 on the same channel, and AP5 110 operates on the same channel and can be a source of remote interference, as it is part of a shared media channel which is not in direct communication with STA 1 118. Although a small number of frequency channels may be available for all of the stations of the WLAN, it is desired to separate as much as possible each of the access points operating on a particular frequency from other access points operating on the same channel, as shown for channel 1 AP1 102 and AP5 110. A separate set of stations and access points may operate independently on channel 6, shown as STA2 120 and STA 3 122 near AP 8 116, and STA4 124 and STA5 126 which are near AP4 108. Other access points AP2 104 and AP6 112 are also operative on channel 6. In the example of a stadium, where multipath losses are low, one issue that arises is that the access points which share the same channel of operation such as CH6, shown in FIGS. 1 and 2, interact in a manner which reduces the overall bandwidth even though they are physically separated and the respective BSSIDs are associated with different stations.

WLAN communications systems which operate according to IEEE standard 802.11b or 802.11g operate with each station (STA) associated with a particular access point (AP), such that a plurality of stations 120 and 122 may associate with AP8 operative in CH6, and a different plurality of stations such as STA4 124 and STA5 126 may be associated with an access point AP4 which is also operative in CH6, and yet another plurality of stations (not shown) may be associated with access points AP2 and AP6. Under the IEEE 802.11b and 802.11g WLAN standards, the simultaneous transmission by access points and stations is known as a collision, and the AP and STA will re-transmit the packet when the intended recipient of the corrupted packet fails to acknowledge receipt by detecting the missing sequence number of the corrupted packet in the received packet stream. The transmitter will reduce the likelihood of collision through use of the detection of a clear channel assessment (CCA) signal. For the indoor WLAN environment with multi-path reflection, it is desired to operate in the manner, as a station may be associated with an access point through a multi-path reflection environment which produces a weak signal at the associated station or access point.

FIG. 3 illustrates one of the throughput problems associated with having several stations and access points within reception range of each other, such as in a low multi-path reflection high user density environment such as the open stadium shown in FIGS. 1 and 2. In an actual system, the BSSID would be the 48 bit MAC address of the access point, however, for clarity in understanding the invention, each access point of the present example advertises a BSSID in the form of the access point name provided as an underscore suffix. For example, the BSSID associated with AP4 is shown as BSSID_AP4 and the BSSID associated with AP8 is shown as BSSID_AP8. Each station utilizes the well-known 802.11 association protocol to "join" with a particular BSSID. The problem is that although the individual stations have joined a particular BSSID, the channel media is still shared as far as packet acquisition (detection of a packet) and packet transmission (holdoff from transmit when another station or AP is using the shared media) are concerned. FIG. 3 shows an example of this from the perspective of STA2 120, which is associated with BSSID_AP8, and on the same shared media channel 6 as "other" BSSID_AP4. "Other BSSID" 302 indicates packet 326 being transmitted by BSSID_AP8, during which time the "clear channel assessment" CCA 308 is unasserted starting at time 314. The local station STA2 120 has a transmit request 310 with associated packet ready to transmit at time 316, however as shared media, the CCA 308 signal unassertion causes the station to wait until indication of clear channel at time 317, after which time data 322 and associated packet 328 is transmitted. By comparison, at time 320 when transmit request 310 is asserted, the data 324 is immediately sent as packet 330. A similar problem occurs during packet acquisition, as shown in FIG. 4. From the perspective of STA2 120, a packet from "other" BSSID_AP4 arrives, shown in plot 402 as packet 404, and is subject to packet acquisition process by the baseband processor, which performs a preamble detect and acquisition 414, header recovery 416 and begins demodulating the packet payload 416. In this case, the BSSID which will be recovered will be undesired BSSID_AP4 of the "other" station. During this interval, a packet for "our" BSSID_AP8 arrives 406 as shown 408, which has stronger signal level as shown in RSSI 410 waveform, and the coincident stronger signal only serves to corrupt 418 the packet 404 that STA2 had started to acquire.

Therefore, a problem occurs in high density user environments where a large number of stations share a channel number and a plurality of BSSIDs are present, where local station transmission is deferred while awaiting a remote sender on a different BSSID to complete, and reception of a low signal level packet from a remote BSSID interferes with reception of a high signal level packet from a nearby BSSID.

It is desired to provide a mechanism to reduce interference from remote BSSIDs in transmission and reception of packets from a local station, and thereby increase throughput in a high density station environment with multiple access points sharing a particular wireless channel.

OBJECTS OF THE INVENTION

A first object of the invention is the computation of an RSSI_threshold during a listening interval when the RSSI of stations associated with the current access point (AP) and the RSSI of stations not associated with the current access point (AP) are saved for use in computing the RSSI_threshold, the RSSI_threshold used to transmit a current packet during an interval when a station not associated with the current AP is also transmitting.

A second object of the invention is the computation of an RSSI_threshold during a listening interval when the RSSI of stations associated with the current access point (AP) and the RSSI of stations not associated with the current access point (AP) are saved for use in computing the RSSI_threshold, the RSSI_threshold used to determine when to start the packet acquisition process for packets directed to the input of a baseband processor.

SUMMARY OF THE INVENTION

In a high station and access point density environment, where multi-path reflection and attenuation is low, a station which has associated with a particular BSSID enters an observation interval, where a table of BSSIDs and received signal strength indicator (RSSI) minimum and maximum levels for each is taken from observed BSSIDs during the observation interval. Each table entry consists at least of a BSSID, a minimum observed RSSI, and a maximum observed RSSI. After exclusion of BSSID associated with the present station, the min_RSSI of the "other" APs are examined to determine an RSSI_threshold value for use by the baseband processor. The baseband processor defers acquisition of a packet until an RSSI level occurs which exceeds the RSSI_threshold value, after which the baseband processor starts packet acquisition. During station packet transmit, a clear channel assessment (CCA) signal is used to prevent transmission by the station only when the RSSI exceeds the RSSI_threshold. A different RSSI_threshold may be used for receive events compared to transmit events, or an increase in RSSI may be used to re-start the packet acquisition processor.

BRIEF DESCRIPTION OF THE DRAWINGS

FIG. 5 shows a flowchart diagram for generation of BSSID table entries.

FIG. 6 shows a BSSID table with minimum and maximum RSSI values associated with each BSSID.

DETAILED DESCRIPTION OF THE INVENTION

FIG. 5 shows a flowchart for generating a table of BSSID entries, the table for use in generating an RSSI_threshold value for use by the baseband processor for qualifying the transmission and reception of packets. Upon entry of the process 500, in step 502, a BSSID with associated min_RSSI representing a minimum observed RSSI value, and a max_RSSI representing a maximum observed RSSI value, is received. If the BSSID is not found in the table 504, it is added in steps 510 and 512, or alternatively, the minimum and maximum RSSI values are updated or averaged into an existing table entry in step 502. Step 506 represents the observation time for generation of the BSSID table 600, and step 508 computes the RSSI_threshold value.

In one embodiment of the invention, the RSSI_threshold is a value set between the min_RSSI for the BSSID the instant station is associated with, and the max_RSSI for an "other" BSSID, such as the remote access points used by other stations. The RSSI_threshold value may be computed any number of different ways, but the computation relies on the current BSSID of station association having a stronger signal level than a remote BSSID, which is consistent with distance separation from the associated AP as shown in FIG. 2.

Figure 1:
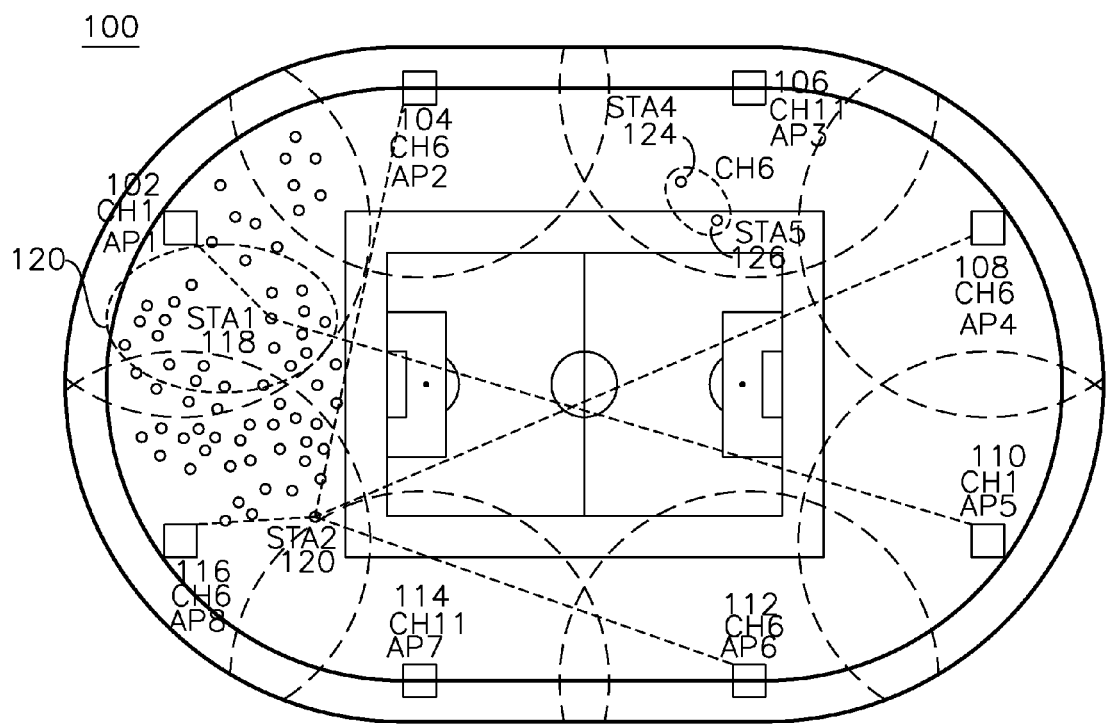
FIG. 1 shows a diagram of a sports stadium with a plurality of access points and a distribution of wireless stations.
Figure 2:
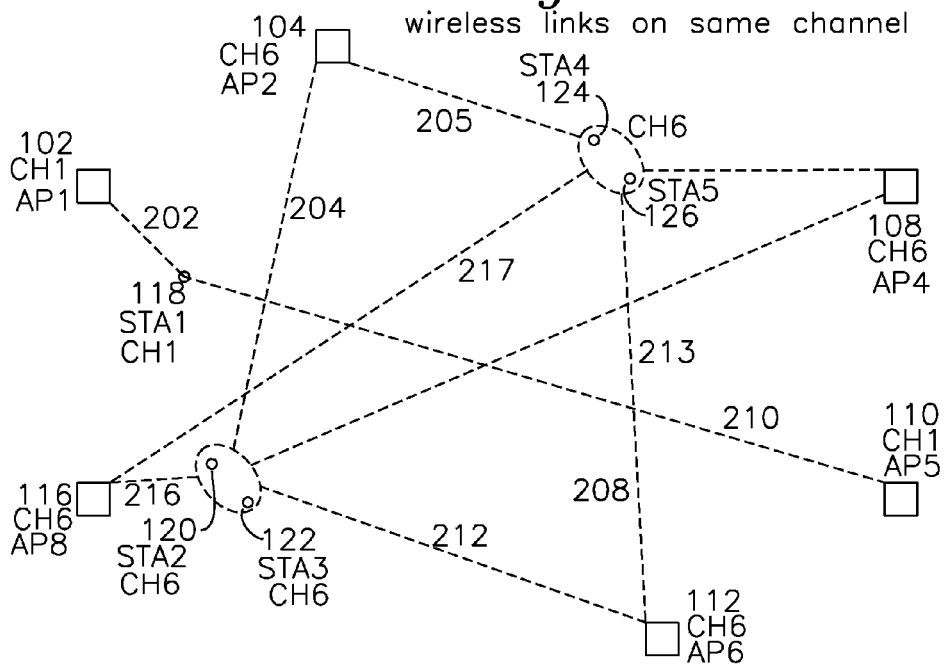
FIG. 2 shows a diagram for a plurality of access points and stations with wireless links therebetween.
Figure 3:
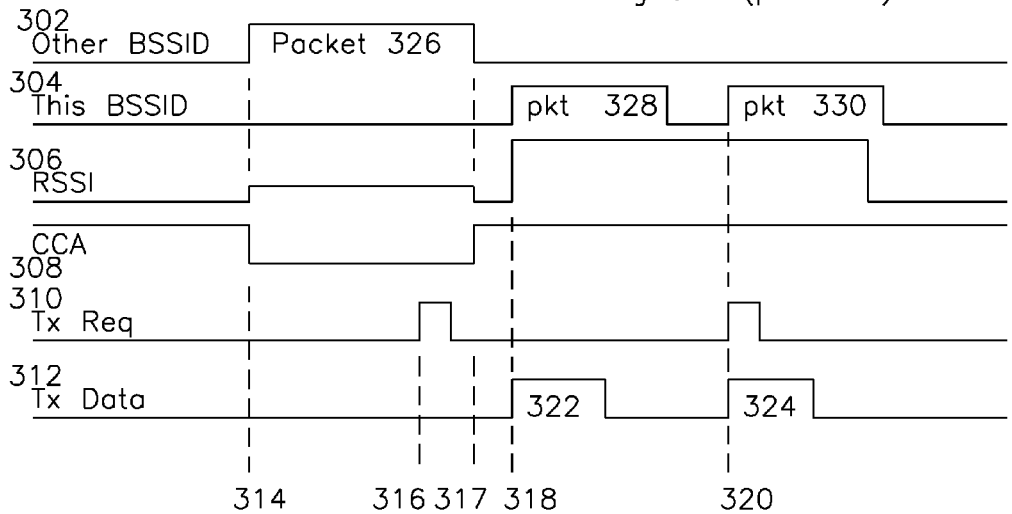
FIG. 3 shows a timing diagram for transmission of a local packet when a remote transmitter is operative.
Figure 4:
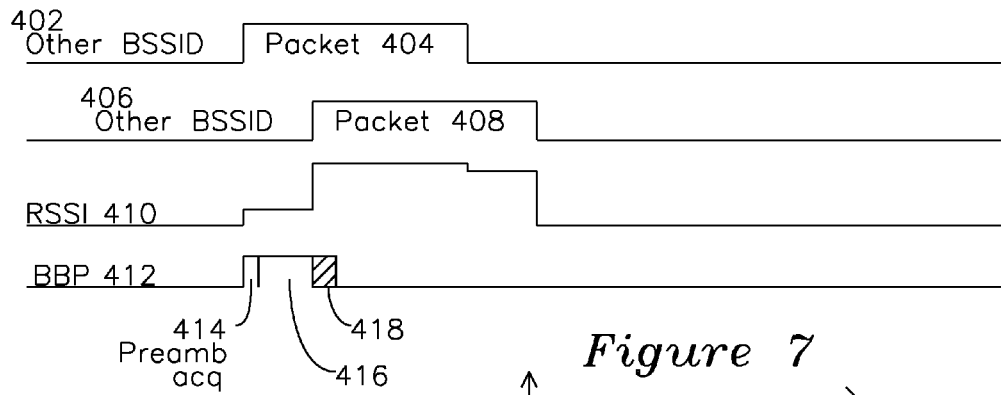
FIG. 4 shows a timing diagram for reception of a local packet which is preceded by the reception of a remote packet.
Figure 7:
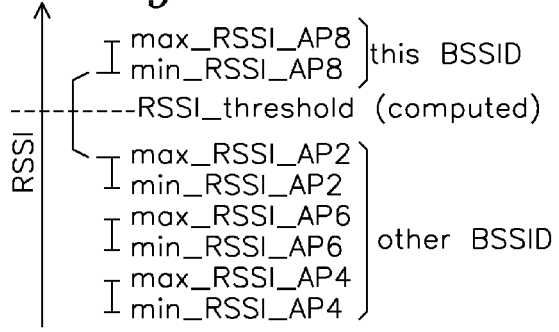
FIG. 7 shows a diagram of RSSI values from the table of FIG. 6 and the example configuration of FIG. 2 arranged according to value.

FIG. 6 shows an example BSSID table for stations on channel 6 of the diagram of FIG. 2, with the suffix associated with the associated access point (AP). As described previously, a typical BSSID is the 48 bit MAC address of the access point, and the RSSI is a numerical value indicating signal strength received at the instant station creating the table. FIG. 7 shows an arrangement of values on an RSSI amplitude scale for the example shown in FIGS. 1 and 2. The most distant station AP4 generates the lowest amplitude range of values from min_RSSI_AP4 to max_RSSI_AP4, and the second highest RSSI range is associated with AP2, which is the second closest station, and the highest RSSI value is associated with nearby AP8, with a large RSSI gap in table entries located between the min_RSSI_AP8 and max_RSSI_AP2. By setting the RSSI_threshold in this range as shown, it is now possible to discriminate between access points for "this" BSSID and other stations which are "other" BSSIDs. In this manner, it is possible to distinguish AP the instant a packet is received, and to use this information in deciding what to do with the packet, or whether to holdoff a pending transmission by the station.

Figure 8:
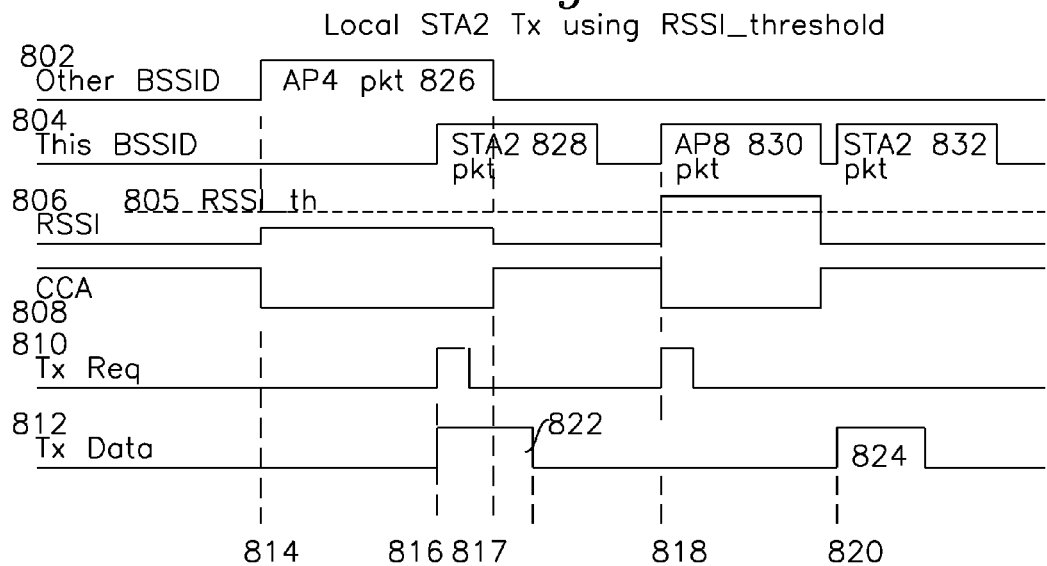
FIG. 8 shows the timing diagram for a transmitter operative with CCA and an RSSI threshold.

FIG. 8 shows a transmit sequence using the RSSI_threshold 805 computed in FIG. 5. A packet 826 is transmitted by an "other" BSSID such as AP4 at time 814, which results in an RSSI 806 which is below the RSSI_threshold value 805, and although the CCA 808 is not asserted, indicating the channel is in use, upon assertion of a transmit request 810 at time 816, the RSSI value 806 below RSSI_threshold 805 causes the transmit baseband processor to override CCA assertion 808 and respond at time 816 with transmission of data 822 and STA2 transmit packet 828 during the time that distant AP4 108 is still transmitting its packet 826. The CCA waveform 808 which indicates the presence of wireless packet energy, and the RSSI value 806 and RSSI_threshold 805 are shown as separate waveforms for clarity in understanding the invention. The CCA 808 can be any signal detection method known in the prior art, including the detection of wireless signal energy, whereas the computation of RSSI_threshold is done using the values from a recent observation period, which may be updated from time to time. In an alternative embodiment of the invention, the combination of RSSI_threshold 805 and RSSI 806 may be used to override or de-assert CCA 808 to achieve the result of early transmit timing 804 after request 810 as is presently shown in FIG. 8. Transmit request 810 is again asserted at time 818 when CCA 808 indicates the channel is not available, but transmit holdoff is honored because the RSSI 806 value exceeds threshold 805, indicating a transmit by "our" BSSID AP8. The transmit processor waits until completion of the BSSID_AP8 packet until time 820, when the STA2 packet 832 is sent. The advantage of the invention is that in a dense environment with many access points, the distant access point will not corrupt the local packet, and with many transmissions and access points operating at the same time, the effective shared media access would be reduced to a negligible value, and local stations would experience a very high rate of CCA unassertion from all the surrounding traffic, and consequently would be unable to transmit data. With the present system, the use of CCA in combination with RSSI_threshold computed from the observed RSSI and BSSID allows the station to discriminate between "our" BSSID for which it should wait until completion, and "other" BSSIDs for which it can ignore for transmit delay, and the local BSSID station for which it should conform to CCA.

Figure 9:
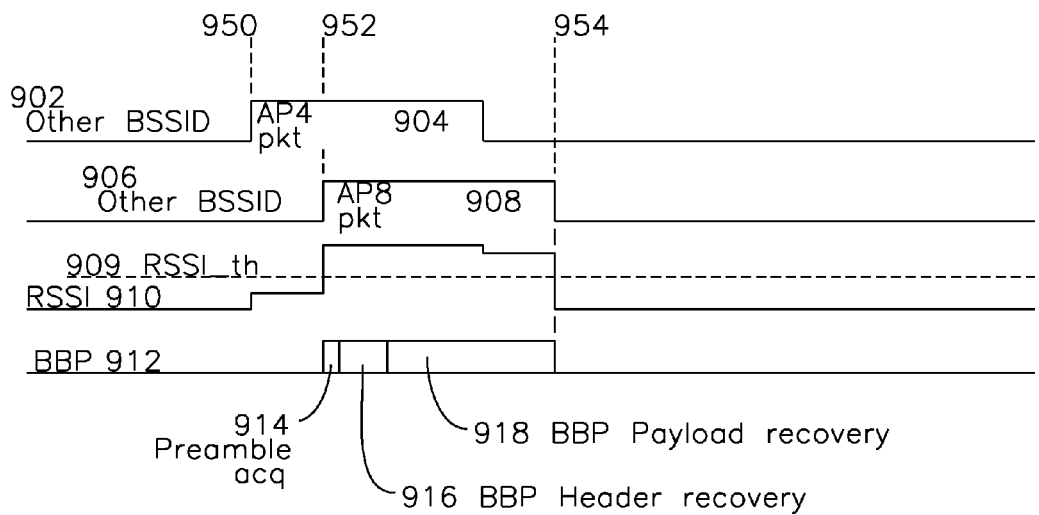
FIG. 9 shows the timing diagram for a receive baseband processor operative with RSSI threshold.

FIG. 9 shows a local station receive process using the RSSI_threshold value 909. At time 950, a packet from AP4 is received, and the baseband processor 912 defers packet acquisition until time 952, when a packet from nearby AP8 908 arrives and generates a higher RSSI value which crosses RSSI_threshold 909. RSSI 910 exceeding RSSI_threshold 909 at time 952 results in the preamble acquisition 914 of the baseband processor starting, followed by header recovery 916 and payload recovery 918. Without the use of RSSI_threshold computed from the surrounding BSSID signal strength values, packet acquisition would have otherwise started incorrectly at time 950, with the packet acquisition of undesired packet 904 corrupted by the AP8 packet 908 we seek to acquire. In another embodiment of the invention, packet acquisition may start at time 950 ignoring the RSSI 910 which is below the RSSI_threshold 909, and then restarted at time 952 when the RSSI 910 jumps above RSSI_threshold 909. The invention therefore improves the utilization of the shared media by using RSSI as an indicator of when to begin packet acquisition, based on the relative strengths of surrounding access point received RSSI.

In the described embodiments, the description of example shows the access point (AP) has made a table of RSSI values for stations which are associated with the AP, and also a set of entries for RSSI values of stations which are not associated with the AP. It is also possible for each station (STA) of the WLAN to use the method described herein and similarly make a table of entries using the method described for FIG. 5 with table entries as shown in FIG. 6, where each STA and AP of a particular BSSID is indicated as "this" BSSID 802 and the "other" BSSIDs 604 are used in the manner described to compute the RSSI_threshold value as shown in FIG. 7 and used to override transmission events of "other" BSSIDs as shown in FIG. 8 or to initiate or restart packet acquisition as shown in FIG. 9.

I claim:

1. A wireless transmitter for congested traffic wireless environments, the wireless transmitter having:
   a list of stations associated with a particular Basic Service Set IDentifier (BSSID), each station in said list of stations having an associated Receive Signal Strength Indicator (RSSI) indicating the strength of a received signal from a respective station;
   an RSSI threshold value computed from an observation period during which a BSSID entry or station entry is placed in a table with an associated RSSI value, each entry also indicating whether it is in said list of stations, said RSSI threshold value computed to be a value less than the weakest RSSI for a station or access point in said list of stations associated with said particular BSSID;
   the wireless transmitter sending a packet if a signal energy from a measured RSSI is below said RSSI threshold, and not sending a packet if the signal energy from a measured RSSI is above said RSSI threshold.

2. The wireless transmitter of claim 1 where said RSSI threshold value is computed to be a value less than the weakest RSSI for a station or access point in said list of stations associated with said particular BSSID and also greater than the strongest RSSI for a station or access point in said list of stations which is not associated with said particular BSSID.

3. The wireless transmitter of claim 2 where said RSSI threshold value is the average of said weakest RSSI and said strongest RSSI during said observation period.

4. The wireless transmitter of claim 1 where said threshold value is re-computed during an observation period following the detection of a new station which is associated with said particular BSSID.

5. The wireless transmitter of claim 1 where an association between a station and an access point in said list of stations is according to the IEEE wireless standard 802.11-2007.

6. The wireless transmitter of claim 1 where said sending a packet if the signal energy from a measured RSSI is below said RSSI threshold and not sending a packet if the signal energy from a measured RSSI is above said RSSI threshold is the result of modifying a Clear Channel Assessment (CCA) signal to indicate a channel is clear for transmission, said CCA signal used to enable said packet transmission.

7. The wireless transmitter of claim 1 where said transmitter is an access point.

8. The wireless transmitter of claim 1 where said transmitter is a station.

9. A wireless receiver operative for congested traffic wireless environments, the wireless receiver associated with a Basic Service Set IDentifier (BSSID) and having:
   a Receive Signal Strength Indicator (RSSI) indicating the signal strength of a received signal from a station or an access point having a BSSID;
   a list of stations associated with a particular BSSID received by said wireless receiver, each said station accompanied by a Receive Signal Strength Indicator (RSSI) indicating a signal strength for the respective station and also an indicator that the BSSID is associated with said station or not associated with said station;
   an RSSI threshold value computed from an observation period during which a BSSID entry is placed in a table with an associated RSSI value, each entry also indicating whether said station is associated with said particular BSSID or is not associated with said particular BSSID, the RSSI threshold value computed to be less than the weakest RSSI for said particular BSSID which is associated with said station greater than the strongest RSSI for a BSSID which is not associated with said station;
   the wireless receiver starting packet acquisition when a measured RSSI is above said RSSI threshold value.

10. The wireless receiver of claim 9 where said weakest RSSI is the weakest RSSI of all stations associated with said particular BSSID over said observation period.

11. The wireless receiver of claim 9 where said RSSI threshold value is the average value of said weakest RSSI of stations associated with said particular BSSID and said strongest RSSI during said observation period.

12. The wireless receiver of claim 9 where said RSSI threshold value is re-computed during an observation period following a detection of a new station which is associated with said particular BSSID.

13. The wireless receiver of claim 9 where said association is performed according the IEEE wireless standard 802.11-2007.

14. A process for a wireless transmitter, the wireless transmitter associated with a particular Basic Service Set IDentifier (BSSID), the wireless transmitter operative with other wireless stations which are either associated with said particular BSSID, or not associated with said particular BSSID, the process having the steps:

during an observation period, receiving station identifiers and BSSIDs, each said station identifier and BSSID accompanied by a Receive Signal Strength Indicator (RSSI), thereafter indicating for each received BSSID and station identifier the accompanying RSSI and also indicating that the received BSSID or station identifier is either associated with said particular BSSID, or the received BSSID or station identifier is not associated with said particular BSSID;

computing a transmit threshold which is below the lowest RSSI for a station identifier or BSSID among said wireless stations associated with said particular BSSID;

transmitting a packet when said wireless transmitter measures an RSSI which is less than said transmit threshold.

15. The process for a wireless transmitter of claim 14 where said transmitter is operative as an access point.

16. The process for a wireless transmitter of claim 14 where said observation is performed when a new station or BSSID is detected as being added or removed.

17. A process for a wireless receiver having a Basic Service Set IDentifier (BSSID), the wireless receiver associated with a particular access point having a particular BSSID, the process having the steps:

during an observation period, receiving station identifiers and BSSIDs, each accompanied by a Receive Signal Strength Indicator (RSSI) value, thereafter indicating for each received BSSID and station identifier the accompanying RSSI and also indicating either said station identifier or said BSSID is associated with said particular BSSID, or indicating said station identifier or said BSSID is not associated with said particular BSSID;

computing an RSSI threshold which is less than the lowest RSSI for a station or BSSID which is associated with said particular BSSID, and greater than the highest value RSSI from among a station or BSSID which is not associated with said particular BSSID;

said wireless receiver starting packet acquisition when said measured RSSI is above said RSSI threshold.

18. The process for the wireless receiver of claim 17 where said observation period step is performed when reception of a packet from a new station or access point is detected.

19. The process for the wireless receiver of claim 17 where said receiver is operative as an access point.

\* \* \* \* \*